United States Patent
Welker et al.

(10) Patent No.: US 6,898,682 B2
(45) Date of Patent: May 24, 2005

(54) AUTOMATIC READ LATENCY CALCULATION WITHOUT SOFTWARE INTERVENTION FOR A SOURCE-SYNCHRONOUS INTERFACE

(75) Inventors: James A. Welker, Austin, TX (US); Srinath Audityan, Austin, TX (US); Jose M. Nunez, Austin, TX (US); Robert C. Podnar, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 360 days.

(21) Appl. No.: 10/217,174

(22) Filed: Aug. 12, 2002

(65) Prior Publication Data

US 2004/0030853 A1 Feb. 12, 2004

(51) Int. Cl.[7] .............................................. G06F 12/00
(52) U.S. Cl. ........................................ 711/163; 365/233
(58) Field of Search .............................. 711/163, 105, 711/156, 164; 365/233; 714/724

(56) References Cited

U.S. PATENT DOCUMENTS

| | | | | |
|---|---|---|---|---|
| 5,295,141 A | * | 3/1994 | Person .......................... | 714/724 |
| 5,426,756 A | | 6/1995 | Shyi et al. | |
| 5,546,404 A | * | 8/1996 | Takahashi et al. ............. | 714/724 |
| 5,708,622 A | * | 1/1998 | Ohtani et al. .................. | 365/233 |
| 5,819,057 A | * | 10/1998 | Witt et al. ...................... | 712/204 |
| 5,835,448 A | * | 11/1998 | Ohtani et al. .................. | 365/233 |
| 6,704,382 B1 | * | 3/2004 | Metzler et al. ................. | 375/376 |
| 2003/0126356 A1 | * | 7/2003 | Gustavson et al. ............ | 711/105 |
| 2004/0062137 A1 | * | 4/2004 | Phan et al. ..................... | 365/233 |

FOREIGN PATENT DOCUMENTS

JP      2000276877      * 10/2000      ......... G11C/11/407

OTHER PUBLICATIONS

Draft/Advance, SLDRAM Inc., SLD4M18DR400/4 Meg× 18 SLDRAM Pipelined, Eight Bank, 2.5V Operation, 400 Mb/s/pin SLDRAM, Rev. Feb. 12, 1998.*

* cited by examiner

Primary Examiner—Pierre Bataille (57) ABSTRACT

In response to a clock cycle and a pending READ command for data with a variably recurring access latency, a clock cycle count is adjusted. If a latency value has not been locked and if the READ command is a first READ command, the clock cycle count is stored as a locked latency value upon receiving a synchronized data available event (DQS for instance). Each subsequent READ command has an associated clock cycle count to enable pipelining wherein the clock cycle count for each READ starts incrementing when the individual READ command is issued. For subsequent READ commands, if the cycle count compares favorably with the locked latency value, data can be sampled safely from the interface at the identical latency for every READ request issued. The locked latency value can be read and/or written by software/hardware such that the read latency is consistent across multiple devices for reproducibility during debug.

12 Claims, 5 Drawing Sheets

AUTOMATIC READ LATENCY CALCULATION WITHOUT SOFTWARE INTERVENTION FOR A SOURCE-SYNCHRONOUS INTERFACE

FIELD OF THE INVENTION

The present invention relates to high-speed memory devices, and more particularly to read latency calculation in a high-speed memory device with variable recurring latency.

BACKGROUND OF THE INVENTION

The rapid increase in processor speed has necessitated a commensurate increase in memory access speed of off-chip caches or memory to prevent memory accesses from becoming a bottleneck. Traditionally, access to off-chip memory devices has been in accordance with a synchronous protocol. Synchronous protocols, in which off-chip accesses have a guaranteed bounded recurring latency relationship, have been easy to implement and are well defined. Synchronous protocols generally have been implemented by a clock that distributes a clock signal to an on-chip controller and to the off-chip caches or memory. Accesses are initialized and terminated only at transitions in value of the clock signal.

However, interfaces for which synchronous protocols are used are limited by a physical delay between communicating devices. System design requires a uniform clock among the various devices, mandating that clock wires be routed across the interface, increasing complexity of design. Due to these limitations, source-synchronous protocols are increasingly the interface of choice for higher speed off-chip interfaces.

In a source-synchronous interface, a source provides data and/or a command and a timing reference that accompanies the data and/or command. The source expects the recipient to capture the data and/or command based on the timing reference. The timing reference allows the recipient to receive the data and/or command despite lack of any timing relationship between the source and the recipient, creating an asynchronous boundary at the recipient. Interfaces for which source-synchronous protocols are used allow devices in distinct timing domains to exchange data despite a lack of a common clock. For example, an on-chip controller in a first timing domain can exchange data with an off-chip cache or memory in a second timing domain. Source-synchronous data transfers between devices in different timing domains can be complicated by latency, complexity, and a lack of repeatability. "Repeatability," in this context, is defined as a lack of deviation in latency between an access and a subsequent access.

Traditionally, two main avenues have been followed when implementing source-synchronous interfaces. First, the read latency due to the asynchronous nature of the interface has been allowed to vary from access to access. This variance hampers debugging of a processor where cycle reproducibility is required. The difficulty of debugging is further compounded when two processors with minor manufacturing differences are not comparable on a cycle-to-cycle basis. The second approach for implementing a source-synchronous system addresses the reproducibility issue by creating a software interface that allows the operating system to set the latency for all accesses. The software interface, while maintaining reproducibility, requires the system designer to manually calculate the latency of an interface including all wiring delays. The novel invention described herein provides the reproducibility of the software interface, while hiding wiring and other latency details from the system designer. Since the ability to be cycle-reproducible is critical in the debugging of a system in a lab, and the time-consuming task of manually calculating interface latency is hidden from a system designer, the invention described herein can have a positive impact on the time-to-market period of a new system, thus improving overall revenue.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the following drawings.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE PREFERRED EMBODIMENT

The invention includes, in accordance with one aspect of the present invention, a novel solution that minimizes latency and complexity of a source-synchronous interface design, and forces repeatably identical latency for each interface access.

Memory System Hardware Embodiment

Figure 1:
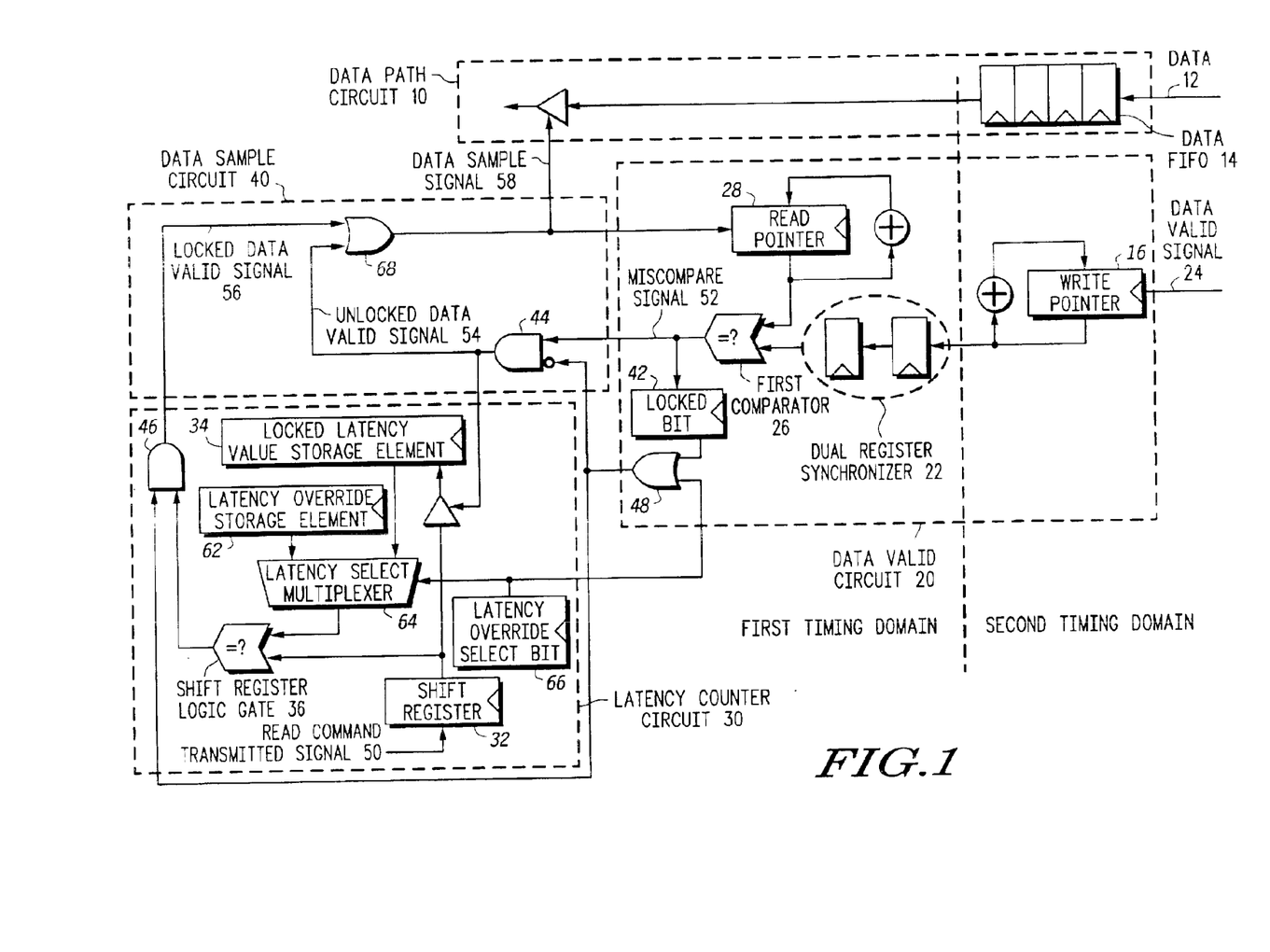
FIG. 1 is a schematic diagram of a receive side of a source-synchronous on-chip memory system controller that receives data in response to a READ command, in accordance with a first embodiment of the present invention.

A source-synchronous on-chip memory controller issues a READ command and receives data that is generated by an off-chip memory device in response to the READ command. FIG. 1 is a schematic diagram of the receive side of a source-synchronous on-chip memory system controller. The transmit side of the on-chip controller that transmits READ commands is not shown. The receive circuitry includes a data path circuit 10, a data valid circuit 20, a latency counter circuit 30, and a data sample circuit 40. A first timing domain as shown in FIG. 1 is determined to be the base timing domain of the on-chip controller. The second timing domain is determined to be the base timing domain of the off-chip device, and of the timing domain interface circuitry of the on-chip device. The use of the terminology on-chip and off-chip should not preclude implementations where the on-chip device and off-chip device exist on the same silicon (or related material) module, multi-chip module, circuit board, or similar device.

Data Path Circuit 10 and Data Valid Circuit 20

The data path circuit 10 is operative to receive data 12 across the interface from the off-chip memory device. A read command generator, not shown, operating in a first timing domain, issues one or more READ commands to the off-chip memory device. The off-chip memory device provides the data 12 in the second timing domain in response to the READ commands, and the data path circuit 10 places the data 12 into a data FIFO 14. The data in the data FIFO 14 can be observed by data collection circuitry that either forwards the data on to consumer circuitry (not shown in the figures), and/or accumulates the data in an "accumulator" latch for forwarding at a later time.

The data 12 is accompanied by a data valid signal 24 that is received by a data valid circuit 20. The data valid signal 24 is, for example, a data query strobe (DQS) in a Joint Electron Device Engineering Counsel, JEDEC, compliant double-data rate (DDR) interface specification, indicating that the data is valid. It will be appreciated that the data valid signal 24 need not comply with any particular specification or standard, and that any signal indicating that a corresponding source-synchronous data signal is valid may be used. The data valid circuit 20 also contains a write pointer 16 that is incremented in response to the data valid signal 24 as the data 12 is being written into the data FIFO 14. A dual register synchronizer 22 synchronizes the write pointer value (i.e., contents of the write pointer 16) into the first timing domain.

The data valid circuit 20 also contains a read pointer 28 containing a read pointer value, and a first comparator 26 that asserts a miscompare signal 52 in response to the write pointer value being unequal to the read pointer value.

In another embodiment, if desired, several data valid signals may be available, each of which is provided to its own first comparator 26, leading to several miscompare signals that are ANDed together before being provided to the locked bit 42. If desired, rather than comparing the read pointer value with the write pointer value, the data valid circuit 20 may assert the miscompare signal 52 in response to the data valid signal 24 directly. Alternatively, if desired, the on-chip device may emit a free-running clock signal that is sampled, then echoed by the off-chip device back to the on-chip device. The data valid circuit 20 may create a data valid signal 24 by comparing the number of clocks sent and received. In the described embodiments, however, the off-chip memory device generates the data valid signal 24 in the second timing domain in response to a READ command that is generated by the on-chip controller in the first timing domain.

The on-chip controller of FIG. 1 contains a locked bit 42 that is cleared in response to a power-on event or an interface frequency chance event and is not set until the miscompare signal 52 is generated. The miscompare signal 52 causes the locked bit 42 to be set. Once set, the locked bit 42 is not cleared during normal operation of the memory system. Accordingly, the locked bit 42 indicates whether the on-chip controller has received data (or, more specifically, the data valid signal 24) since the most recent power-on event or interface frequency change event.

Latency Counter Circuit 30

Although the following implementation is described as a shift register, it should be understood that any mechanism used to track outstanding operations in a pipelined interface could be used wherein a shift register is just one example.

The latency counter circuit 30 includes a shift register 32, a locked latency value storage element 34, a latency override storage element 62, a second AND-gate 46, a latency select multiplexer 64, and a shift register logic gate 36. The shift register 32, having a plurality of shift register bits and containing a shift register value, is initialized to zero in response to a power-on event and is shifted in the first timing domain. The shift register 32 receives a "one" input during any clock cycle in which the on-chip controller generates a READ command transmitted signal 50 from the on-chip controller transmit circuitry, and receives a "zero" input during any clock cycle in which the on-chip controller does not generate a READ command. Since the "one" input is clocked to a new bit position within the shift register 32 in response to each clock cycle, each shift register bit that contains a "one" has a bit position within the shift register 32 that corresponds to a number of clock cycles from the time a corresponding READ command was generated.

The on-chip controller has an unlocked data valid signal 54 that is asserted for one clock cycle in response to a first assertion of the miscompare signal 52, and then is not asserted again during normal operation of the memory system. The locked bit 42 is used (when the latency override select bit 66 is cleared) to determine whether the unlocked data valid signal 54 is de-asserted. Before the locked bit 42 is set, the miscompare signal 52 causes the unlocked data valid signal 54 to be asserted, and then causes the locked bit 42 to be set, deasserting the unlocked data valid signal 54 upon subsequent clock cycles. A first AND-gate 44 generates the unlocked data valid signal 54.

When the latency override select bit 66 is not set, the first AND-gate 44 receives the locked bit 42 via a first OR-gate 48. When the latency override select bit 66 is set, the first AND-gate 44, the unlocked data valid signal 54 and the locked latency value storage element 34 become irrelevant, since the locked latency value storage element 34 is not provided to shift register logic gate 36 (described below). Instead, a software-generated value obtained from a latency override storage element 62 (also described below) is provided to the shift register logic gate 36. The latency override select bit 66 may be set by software.

During the one clock cycle in which the unlocked data valid signal 54 remains asserted, a selected bit of the locked latency value storage element 34 is set to "one," and all other bits of the locked latency value storage element 34 are cleared to "zero." The selected bit corresponds to the "deepest" bit of the shift register value; i.e., to the "one" input within the shift register 32 that has been shifted furthest, and therefore to a number of clock cycles associated with an expected READ latency.

If desired, the value in the locked latency value storage element 34 may be increased by one or two additional clock cycles, to provide an additional margin for synchronization at the cost of additional latency. If desired, the value in the locked latency value storage element 34 may be reduced by one or two additional clock cycles, for improved latency.

If desired, instead of the foregoing, the shift register 32 may be replaced with a group of counters, each of which corresponds to a distinct READ command that has been issued to the off-chip memory device. Each counter is initialized in response to a distinct READ command. When a READ command is generated, the counter is enabled and initiated. (A read counter may also be added to keep track of which counter is to be initialized upon a next READ command.) A first counter is coupled to the locked latency value storage element 34 and has a value that is loaded into the locked latency value storage element 34 in response to the unlocked data valid signal 54, which is asserted during only one clock cycle until a subsequent power-on event or interface frequency change event. Thereafter, the locked data valid signal 56 is asserted whenever at least one of the counters has a value that equals the locked latency value storage element 34. A second AND-gate 46 generates the locked data valid signal 56.

Also, if desired, the shift register 32 may be replaced with a network of flip-flops and/or counters that keep track of which data provided by the off-chip memory device is associated with which READ command. A network of counters that clock in response to rising edges, falling edges, and both rising and falling edges, as well as counters that reset at different numbers of clock cycles, may provide sufficient coverage with less physical die space than a shift register 32 with similar coverage. If desired, the locked latency value storage element 34 may be implemented as a second shift register that receives a "one" when a first READ command is generated (and not when other READ commands are generated), and shifts in response to each clock cycle before the locked bit 42 is set. After the locked bit 42 is set, the second shift register is no longer shifted.

The latency override storage element 62 contains a software override value, if software has provided a software override value. The latency select multiplexer 64 receives a latency override select from a latency override select bit 66 that is either set or cleared by software. If desired, the latency select multiplexer 64 may default to a clear value, and may automatically be set in response to software override value being written by software into the latency override storage element 62. If the latency override storage element 62 contains a value and the latency override select bit 66 is set, then the shift register logic gate 36 receives the software override value from the latency override storage element 62. If the latency override select bit 66 is not set, then the shift register logic gate 36 receives the value in the locked latency value storage element 34.

The shift register logic gate 36 determines whether data may be expected during a current clock cycle. The shift register logic gate 36 compares the selected bit of the shift register value (corresponding to a number of clock cycles associated with an expected READ latency) with the corresponding bit of the shift register value. The shift register 32 receives a "one" input during any clock cycle in which the on-chip controller generates a READ command transmitted signal 50, and after a number of clock cycles associated with an expected READ latency have elapsed, data may be expected. Since the selected bit of the locked latency value storage element 34 corresponds to the number of clock cycles associated with an expected READ latency, the shift register logic gate 36 contains a Boolean multi-bit AND operation to compare the selected bit of the locked latency value storage element 34 with the shift register value. A Boolean OR operation then determines whether any of the various bits resulting from the Boolean multi-bit AND operation are "one." The Boolean multi-bit AND operation and the Boolean OR operation are performed within the shift register logic gate 36.

Data Sample Circuit 40

The data sample circuit 40 actually samples the data from the data FIFO 14 when, and only when, data may reasonably be expected. The data sample circuit 40 reads data 12 from the data FIFO 14 and increments the read pointer value in response to the asserting of a data sample signal 58. Before the locked bit 42 is set, the data sample signal 58 is asserted in response to the unlocked data signal 54, which is asserted in response to the miscompare signal 52 (or the data valid signal 24). After the locked bit 42 is set, the data sample signal 58 is asserted in response to the locked data valid signal 56. A Boolean OR operation, performed by a second OR-gate 68, asserts the data sample signal 58 in each situation. The data sample signal 58 is asserted in response to the unlocked data valid signal 54 (indicating a first data has been received and that the locked bit is not yet set) or the locked data valid signal 56 (indicating that, after the locked bit became set, a "one" has progressed through the shift register 32 to the bit position indicated by the locked latency value storage location). The data sample signal 58 is asserted when either the unlocked data valid signal 54 or the locked data valid signal 56 is asserted, and allows the data path circuit 10 to access the data 12.

The off-chip memory device (not shown in FIG. 1) can be implemented as a double or single data rate, synchronous dynamic random access memory (SRAM), dynamic or static access, random or read-only memory that provides data in response to a READ command. If desired, the off-chip device can be replaced by any device that provides source-synchronous data in response to a command, request, or signal. The on-chip controller, if desired, may be replaced with a generic bus master generating requests to a bus slave device using a similar protocol.

Timing Diagram

Issuing Read Commands

Figure 2:
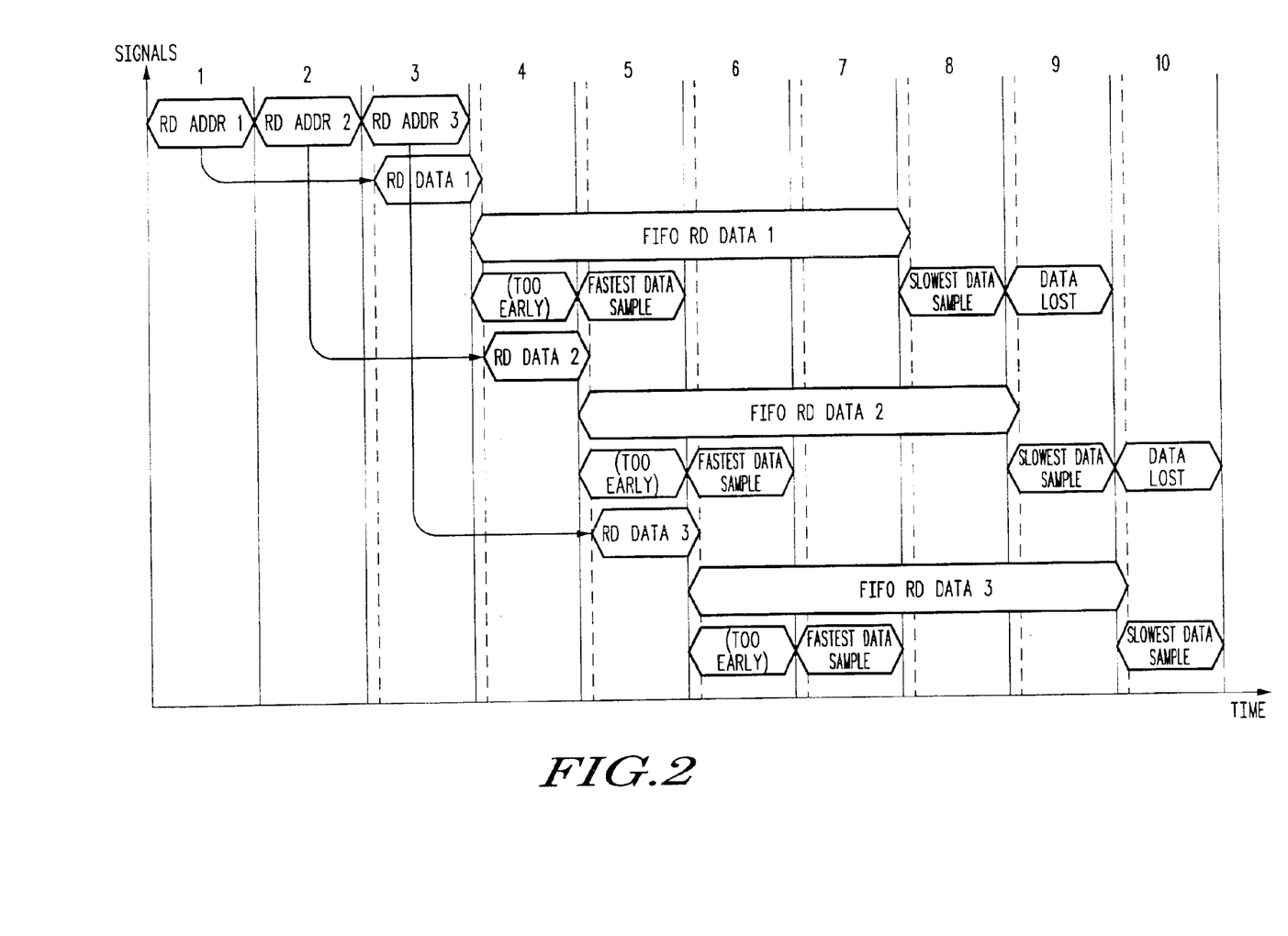
FIG. 2 is a timing diagram of a memory access in accordance with the memory system of FIG. 1.

FIG. 2 is a generic timing diagram of a memory access in accordance with the memory system of FIG. 1. FIG. 2 is meant to illustrate the basic pipelined nature of a source-synchronous memory system. FIG. 2 does not illustrate the timing relationship of the circuits in this novel invention. Each numbered column of FIG. 2 constitutes one clock cycle in the first timing domain of the on-chip controller. The first row contains pipelined read operations, transmitted by the on-chip controller one cycle apart. The remaining rows display the timing relationships of the data returned from the off-chip controller for the three transmitted read operations. At a first clock cycle, a first READ address is generated. At a second clock cycle, a second READ address is generated. At a third clock cycle, a third READ address is generated. A first arbitrary number of clock cycles may elapse between the first READ address and the second READ address, and a second arbitrary number of clock cycles may elapse between the second READ address and the third READ address. The first READ address, the second READ address, and the third READ address are generated by the on-chip controller on edges (rising or falling) of the same clock, but otherwise share no particular timing relationship.

The First Read Data in the Second Timing Domain

Beginning late in the third clock cycle, and two clock cycles after the first READ address is generated, the off-chip data device generates a first READ data in response to the first READ address. Generating the first READ data is labeled "RD DATA 1" in FIG. 2. Since the first READ data is generated by the off-chip memory device, which operates entirely in the second timing domain, generating the first READ data occurs in the second timing domain. Clock cycles of the second timing domain are shown as dashed lines in FIG. 2.

The off-chip memory device provides the first READ data to the on-chip controller, where the first READ data becomes available late in the third clock cycle. Setup requirements prevent the first READ data from becoming available earlier than the third clock cycle. In the fourth clock cycle, the first READ data is placed into the data FIFO. Placing the first READ data into the data FIFO is labeled "FIFO RD DATA 1" in FIG. 2. Since the data FIFO is capable of holding at least four distinct READ data values, the first READ data remains within the data FIFO for at least four clock cycles.

The First Read Data in the First Timing Domain

The on-chip controller samples the first READ data in the first timing domain while the first READ data remains within the data FIFO. Although the first READ data is placed in the data FIFO during the fourth clock cycle of the second timing domain, the fourth clock cycle occurs too early for the on-chip controller to sample the first READ data. The timing domains differ slightly, and the fourth clock cycle occurs earlier in the first timing domain than in the second timing domain. The on-chip controller must wait until the first timing domain has a fifth clock cycle before attempting to sample the first READ data, even though the first READ data has been placed in the data FIFO during the fourth clock cycle. If the on-chip controller attempts to read the first READ data from the data FIFO earlier than the fifth clock cycle, the on-chip controller retrieves possibly incorrect data.

The fifth clock cycle is a first "fastest to data sample" cycle, during which the on-chip controller is able to read the first READ data from the data FIFO. Since the first READ data remains in the data FIFO for four clock cycles, the eighth clock cycle is a last clock cycle (i.e., "slowest to data sample" cycle) during which the on-chip controller is able to read the first READ data from the data FIFO.

The ninth clock cycle is a "data lost" cycle, during which the on-chip controller is not able to read the first READ data from the data FIFO; since more than four clock cycles have elapsed since the data was placed in the data FIFO, it is possible that the data may have been shifted out of the data FIFO. Any data in the data FIFO might be incorrect. If the on-chip controller attempts to read the first READ data from the data FIFO, the on-chip controller might retrieve correct data, but also might retrieve possibly incorrect data.

The Second Read Data in the Second Timing Domain

Beginning late in the fourth clock cycle, and two clock cycles after the second READ address is generated, the off-chip data device generates a second READ data in response to the second READ address. Generating the second READ data is labeled "RD DATA 2" in FIG. 2. Since the second READ data is generated by the off-chip memory device, which operates entirely in the second timing domain, generating the second READ data occurs in the second timing domain.

The off-chip memory device provides the second READ data to the on-chip controller, where the second READ data becomes available late in the fourth clock cycle. Setup requirements prevent the second READ data from becoming available earlier than the fourth clock cycle. In the fifth clock cycle, the second READ data is placed into the data FIFO. Placing the second READ data into the data FIFO is labeled "FIFO RD DATA 2" in FIG. 2. Since the data FIFO is capable of holding at least four distinct READ data values, the second READ data remains within the data FIFO for at least four clock cycles.

The Second Read Data in the First Timing Domain

The on-chip controller samples the second READ data in the first timing domain while the second READ data remains within the data FIFO. Although the second READ data is placed in the data FIFO during the fifth clock cycle of the second timing domain, the fifth clock cycle occurs too early for the on-chip controller to sample the second READ data. Due to slight differences between the timing domains, the fifth clock cycle occurs earlier in the first timing domain than in the second timing domain. The on-chip controller must wait until the first timing domain has a sixth clock cycle before attempting to sample the second READ data, even though the second READ data has been placed in the data FIFO during the fifth clock cycle. If the on-chip controller attempts to read the second READ data from the data FIFO earlier than the sixth clock cycle, the on-chip controller retrieves possibly incorrect data.

The sixth clock cycle is a second "fastest to data sample" cycle, during which the on-chip controller is able to read the second READ data from the data FIFO. Since the second READ data remains in the data FIFO for four clock cycles, the ninth clock cycle is a last clock cycle (i.e., "slowest to data sample" cycle) during which the on-chip controller is able to read the second READ data from the data FIFO.

The tenth clock cycle is a "data lost" cycle, during which the on-chip controller is not able to read the second READ data from the data FIFO; since more than four clock cycles have elapsed since the data was placed in the data FIFO, it is possible that the data may have been shifted out of the data FIFO. Any data in the data FIFO might be incorrect. If the on-chip controller attempts to read the second READ data from the data FIFO, the on-chip controller might retrieve correct data, but also might retrieve possibly incorrect data.

The Third Read Data in the Second Timing Domain

Beginning late in the fifth clock cycle, and several clock cycles after the third READ address is generated, the off-chip data device generates a third READ data in response to the third READ address. Generating the third READ data is labeled "RD DATA 3" in FIG. 2. Since the third READ data is generated by the off-chip memory device, which operates entirely in the second timing domain, generating the third READ data occurs in the second timing domain. The third read proceeds in a fashion similar to the previous two reads. The description, as such, will be omitted for brevity.

First Method Embodiment

Figure 3:
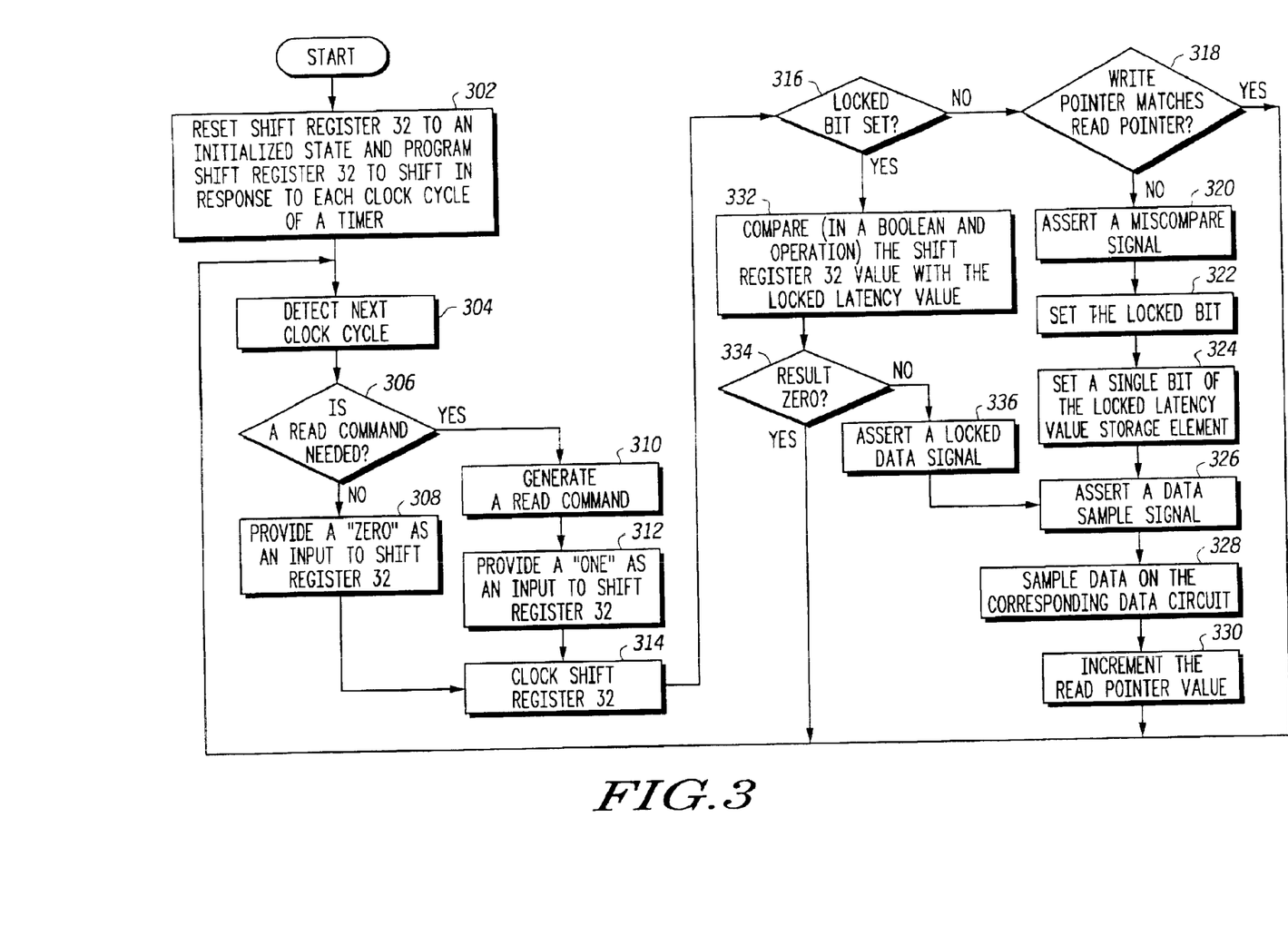
FIG. 3 is a flowchart depicting a method for receiving READ data reproducibly on an interface with a variable recurring READ latency, in accordance with a first method embodiment of the present invention.

FIG. 3 is a flowchart depicting a method for receiving READ data reproducibly on an interface with a variable recurring read latency, in accordance with a first method embodiment of the present invention. The method may be applicable in fully pipelined memory interfaces, allowing multiple independent READ commands to be pending, and multiple data values to be stored in a data FIFO.

At step 302, a first shift register is reset to an initialized state, and a first shift register is programmed to shift in response to each clock cycle of a timer. Step 302 may also be performed whenever a clock frequency of the first timing domain is changed. At step 304, a clock cycle is detected. At step 306, a determination is made as to whether a READ command is needed. If a READ command is not needed, then at step 308, a "zero" is provided as an input to the shift register. If a READ command is needed, then at step 310, a READ command is generated (in a first timing domain), and at step 312, a "one" is provided as an input to the shift register. At step 314, the first shift register is clocked.

The READ command may be a first READ command, or the READ command may be a subsequent READ command.

The method of FIG. 3 operates independently of other methods that determine whether to issue a READ command on any particular clock cycle.

At step 316, a determination is made as to whether the locked bit is set. The locked bit is initialized to a cleared value in response to a power-on event. Consequently, unless and until the locked bit is set, control proceeds from step 316 to step 318. At step 318, the write pointer is compared with the read pointer, and a determination is made whether the write pointer value matches a read pointer value. If the write pointer value is equal to the read pointer value, then the method terminates and control returns to step 304 to await a subsequent clock cycle.

On the other hand, if at step 318, the determination is that the write pointer value does not match the read pointer value, then at step 320, a miscompare signal is asserted. At step 322, the locked bit is set.

At step 324, a single bit of the locked latency value storage element is set. The single bit that is set has a bit position within the locked latency value storage element that corresponds to "one" that was provided as an input to the shift register at step 312, and therefore represents the round-trip latency (perhaps adjusted for performance and for other considerations) between the generating of the READ command at step 310 and the determination that the write pointer value does not match the read pointer value at step 318. At step 326, a data sample signal is asserted. At step 328, data is sampled on the corresponding data circuit. At step 330, the read pointer value is incremented.

It will be appreciated that the steps 320-324 may be performed in any order, although it may be desired that step 328 of sampling data on the corresponding data circuit and step 330 of incrementing the read pointer value be performed in response to the step 326 of asserting the data sample signal.

Figure 4:
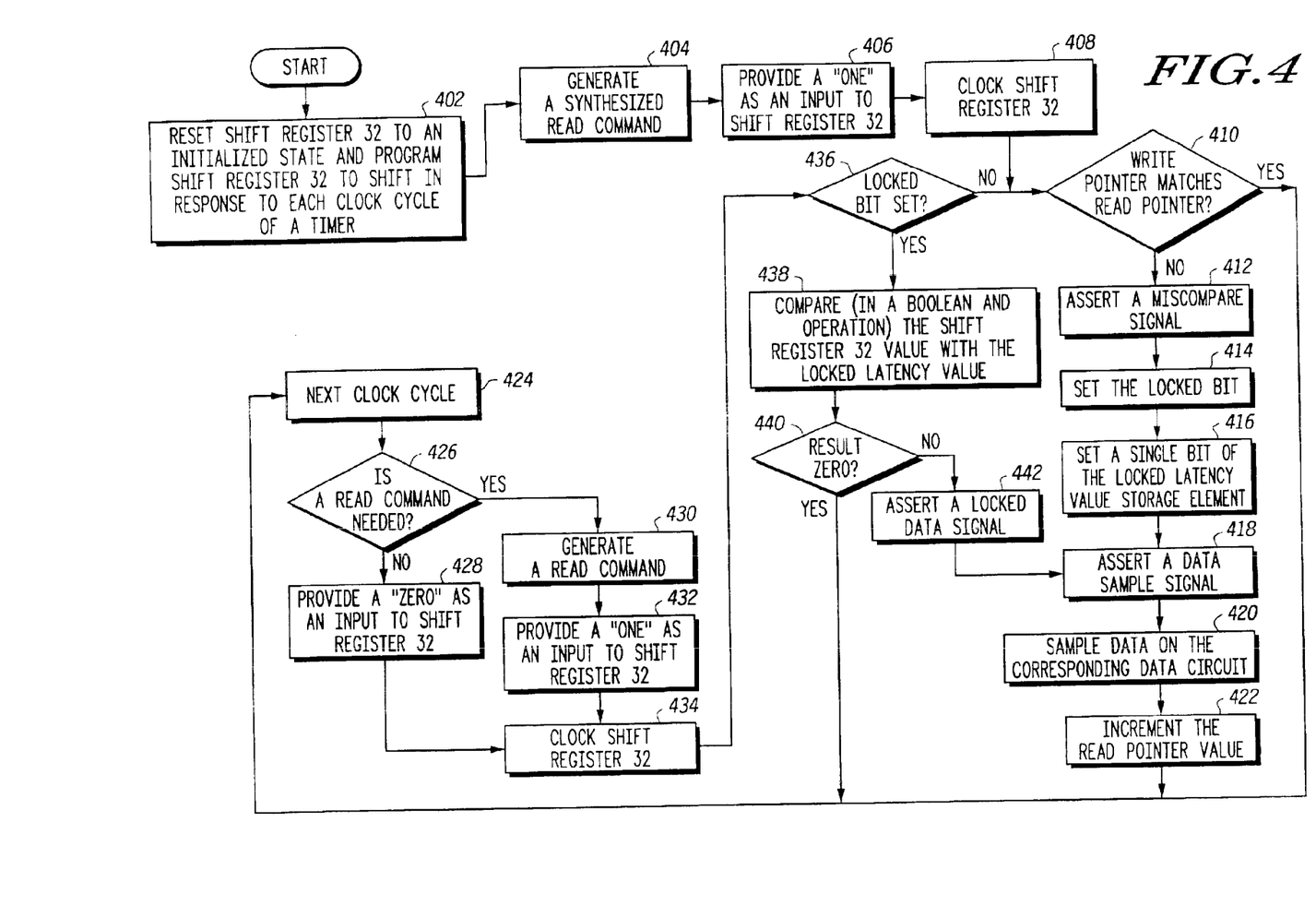
FIG. 4 is a flowchart depicting a method for receiving READ data reproducibly on an interface with a variable recurring READ latency, in accordance with a second method embodiment of the present invention.
Figure 5:
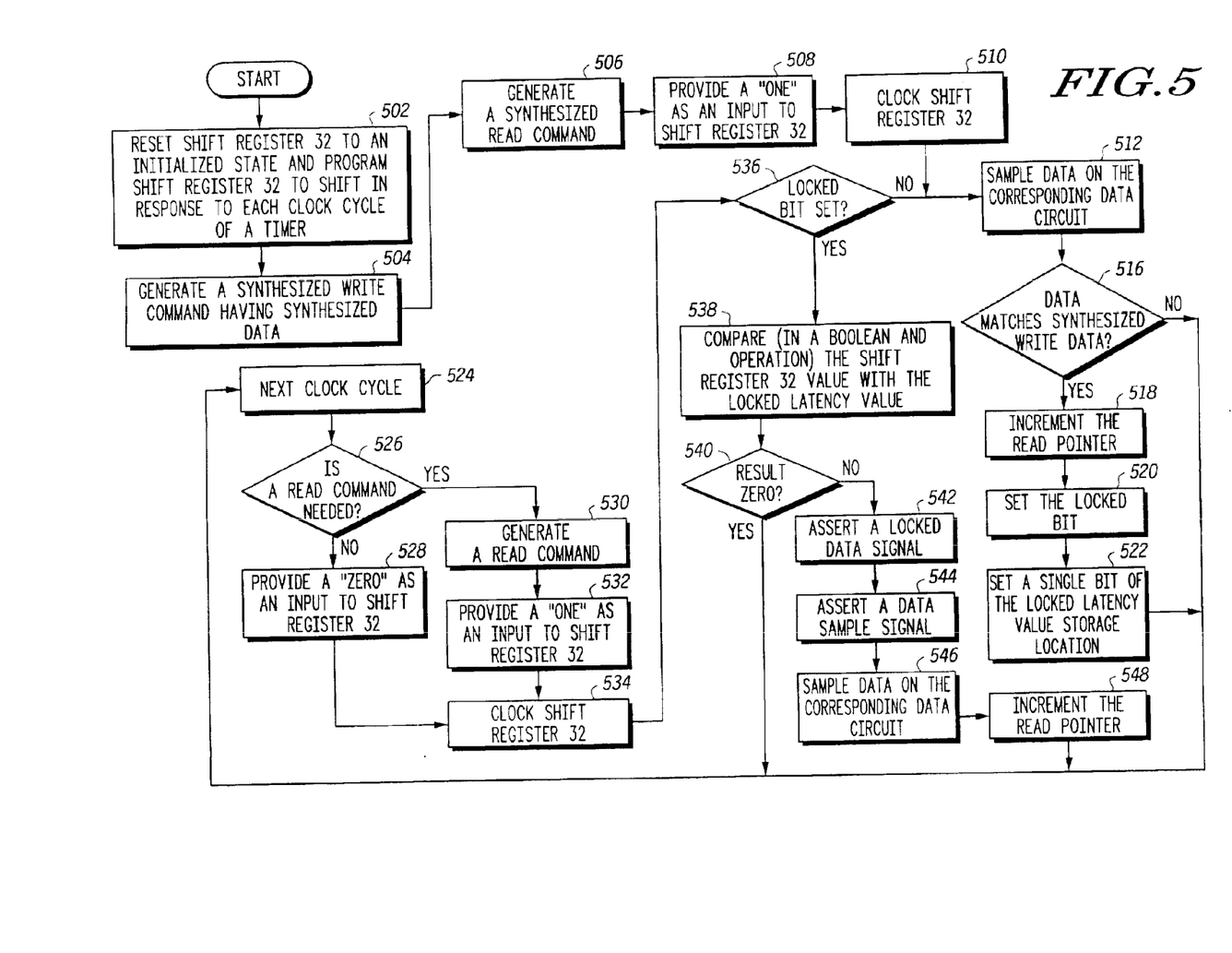
FIG. 5 is a flowchart depicting a method for receiving READ data reproducibly on an interface with a variable recurring READ latency, in accordance with a third method embodiment of the present invention.

Although not shown in FIGS. 3–5, the locked latency value may be overridden by software or hardware before the flow starts. The latency override circuitry (shown in FIG. 1) can be used to make it appear that the locked latency value has already been calculated. As a result, an override locked latency value can be used by the system.

If the method of FIG. 3 is regarded as a sequential process, then control returns to step 304 to begin a second iteration. If the method of FIG. 3 is regarded as an event-driven process, then the method terminates upon the completion of step 330 and then begins a subsequent iteration at step 304 in response to a subsequent clock cycle.

Since the locked bit has already been set during the first iteration at step 322, control proceeds from step 316 to step 328 upon subsequent iterations through the method of FIG. 3. At step 332, a Boolean AND operation compares the shift register with the locked latency value (residing within the locked latency value storage element), and at step 334, a determination is made as to whether the Boolean AND operation produces a non-zero result. Since the only bit of the locked latency value storage element that is set has a bit-position that represents the round-trip latency, and since the shift register is shifted upon each clock cycle and receives a "one" as input upon clock cycles where a READ command is generated, the Boolean AND operation produces a non-zero result during clock cycles when data may be expected to arrive. During such clock cycles, the Boolean AND operation produces a non-zero result, and control proceeds from step 334 to step 336. If the shift register does not contain a "one" in the bit position that corresponds to the single bit of the locked latency value storage element that was set, then the Boolean AND operation produces a zero result, and the method returns to step 304 to await a subsequent clock cycle. If the method of FIG. 3 is regarded as an event-driven process, then the method terminates upon the completion of step 334 and then begins a subsequent iteration at step 304 in response to a subsequent clock cycle.

At step 336, a locked data signal is asserted. If desired, step 336 may be omitted and control allowed to proceed to step 326. At step 326, a data sample signal is asserted. At step 328, data is sampled on the corresponding data circuit. At step 330, the read pointer value is incremented. It will be appreciated that the steps 334, 336, 326, 328, and 330 may be performed in any order, although it may be desired that step 328 of sampling data on the corresponding data circuit and step 330 of incrementing the read pointer value be performed in response to the step 326 of asserting the data sample signal.

Second Method Embodiment

FIG. 4 is a flowchart depicting a method for receiving READ data reproducibly on an interface with a variable recurring read latency, in accordance with a second method embodiment of the present invention. The method may be applicable in fully pipelined memory interfaces, allowing multiple independent READ commands to be pending, and multiple data values to be stored in a data FIFO. The method of FIG. 4 includes a synthesized READ, also known as a "Dummy" READ. The synthesized READ is not intended to provide useful data, but merely to cause an off-chip memory device to provide a data valid signal.

At a step 402, a first shift register is reset to an initialized state, and a first shift register is programmed to shift in response to each clock cycle of a timer. Step 402 may also be performed whenever a clock frequency of the first timing domain is changed. At step 404, a synthesized READ command is generated (in a first timing domain), and at step 406, a "one" is provided as an input to the shift register. The synthesized READ command may be regarded as a first READ command. At step 408, the shift register is clocked.

An off-chip memory device provides a data ready signal in response to the synthesized READ command. The synthesized READ command is generated to a predetermined address of the off-chip memory device.

At step 410, a write pointer is compared with a read pointer, and a determination is made whether the write pointer value matches a read pointer value. The write pointer is implemented to increment in response to the data ready signal. If the write pointer value is equal to the read pointer value, then the method terminates and control proceeds to step 424 to await a subsequent clock cycle.

On the other hand, if the determination (at step 410) is that the write pointer value does not match the read pointer value, then at step 412 a miscompare signal is asserted. At step 414, the locked bit is set.

At step 416, a single bit of the locked latency value storage element is set. The single bit that is set has a bit position within the locked latency value storage element that corresponds to the "one" that was provided as an input to the shift register at step 406, and therefore represents the round-trip latency (perhaps adjusted for performance or for other considerations) between the generation of the READ command at step 404 and the determination that the write pointer value does not match the read pointer value at step 410. At step 418, a data sample signal is asserted. At step 420, data is sampled on the corresponding data circuit. At step 422, the read pointer value is incremented. It will be appreciated that the steps 412–416 may be performed in any order. If the method of FIG. 4 is regarded as a sequential process, then control returns to step 424. If the method of FIG. 4 is regarded as an event-driven process, then the method terminates upon the completion of step 422 and then begins again at step 424 in response to a subsequent clock cycle.

At step 424, a subsequent clock cycle is detected. At step 426, a determination is made as to whether a READ command is needed. If a READ command is not needed, then at step 428, a "zero" is provided as an input to the shift register. After step 428, control proceeds to step 434. If a READ command is needed, then at step 430, a READ command is generated (in a first timing domain), and at step 432, a "one" is provided as an input to the shift register. After step 432, control proceeds to step 434. At step 434, the first shift register is clocked.

Then, at step 436, a determination is made as to whether the locked bit is set. The locked bit is initialized to a cleared value in response to a power-on event or frequency change. Consequently, the locked bit is not set when the only READ commands that are pending are the synthesized READ command and any other READ commands that may have been pipelined before data has been returned.

If the locked bit is not set, control proceeds from step 436 to step 410. If no new data has arrived since the synthesized READ was generated, then the write pointer continues to equal the read pointer, and control proceeds from step 410 to step 424. The "one" that was provided to the shift register at step 406 is clocked through the shift register, and has a bit-position that indicates a number of clock cycles of READ latency since the time when the synthesized READ command was synthesized.

Eventually, data is returned from the off-chip memory device, and the write pointer is incremented again in response to the data ready signal that accompanies the data. At step 410, the determination is made that write pointer does not match the read pointer, then control proceeds to step 412. At step 412, a miscompare signal is asserted. At step 414, the locked bit is set. At step 416, a single bit of the locked latency value storage element is set.

Since the locked bit has been set at step 414 during a previous iteration, control proceeds from step 436 to step 438 upon subsequent iterations through the method of FIG. 4. At step 438, a Boolean AND operation compares the shift register value with the locked latency value (stored within the locked latency value storage element), and at step 440 a determination is made as to whether the Boolean AND operation produces a non-zero result. Since the only bit of the locked latency value storage element that is set has a bit-position that represents the round-trip latency, and since the shift register is shifted upon each clock cycle and receives a "one" as input upon clock cycles where a READ command is generated, the Boolean AND operation produces a non-zero result during clock cycles when data is expected to arrive. During such clock cycles, the Boolean AND operation produces a non-zero result, and control proceeds from step 440 to step 442. If the shift register does not contain a "one" in the bit position that corresponds to the single bit of the locked latency value storage element that was set, then the Boolean AND operation produces a zero result, and the method terminates (or returns to step 424 to await a subsequent clock cycle).

At step 442, a locked data signal is asserted. At step 418, a data sample signal is asserted. At step 420, data is sampled on the corresponding data circuit. At step 422, the read pointer value is incremented.

Third Method Embodiment

FIG. 5 is a flowchart depicting a method for receiving READ data reproducibly on an interface with a variable recurring read latency, in accordance with a third method embodiment of the present invention. The method may be applicable in fully pipelined memory interfaces, allowing multiple independent READ commands to be pending, and multiple data values to be stored in a data FIFO. Like the method of FIG. 4, the method of FIG. 5 includes a synthesized READ, also known as a "Dummy" READ. However, the method of FIG. 5 also includes a synthesized WRITE. The synthesized READ is intended to provide the data that is written in response to the synthesized WRITE. Moreover, the step of comparing the write pointer value with the read pointer value of the method of FIG. 4 is replaced with a step of comparing the data itself in the data FIFO (returned from the off-chip memory device) with the synthesized data of the synthesized WRITE.

At a step 502, a first shift register is reset to an initialized state, and a first shift register is programmed to shift in response to each clock cycle of a timer. Step 502 may also be performed whenever a clock frequency of the first timing domain is changed. At step 504, a synthesized WRITE command is generated to a pre-determined address. The synthesized WRITE command causes data to be provided from the on-chip controller to the off-chip memory device. Data that is written may be arbitrary from the on-chip controller to the off-chip memory device. The data thus written may be referred to as "synthesized data," "dummy data," or "WRITE data." At step 506, a synthesized READ command is generated to the predetermined address used by the synthesized WRITE command (in the first timing domain), and at step 508, a "one" is provided as an input to the shift register. The synthesized READ command may be regarded as a first READ command. At step 510, the shift register is clocked.

At step 512, data is sampled on the corresponding data circuit. The data, obtained from the data FIFO, may be referred to as "sampled data." Sampling the data FIFO allows the sampled data to be compared with the synthesized data. Such a comparison may be useful where the data valid signal is not reliable. At step 516, a determination is made whether the sampled data matches the synthesized data. If the sampled data does not match the synthesized data, then control proceeds to step 524 to await a subsequent clock cycle. If the sampled data matches the synthesized data, then at step 518, the read pointer is incremented and then at step 520, the locked bit is set. If desired, a "compare" signal and an locked data signal may also be generated.

At step 522, a single bit of the locked latency value storage element is set. The single bit that is set has a bit position within the locked latency value storage element that corresponds to the "one" that was provided as an input to the shift register at step 508, and therefore represents the round-trip latency (perhaps adjusted for performance and for other considerations) between the generating of the synthesized READ command at step 506 and the determination is that the sampled data matches the synthesized data at step 516.

It will be appreciated that the steps 520 and 522 may be performed in any order. If desired, the locked latency value may be overridden by software, for example to allow software routines to run thorough software-in-the-loop tests on individual units under test. If desired, the latency counter may be inverted immediately before being copied into the locked latency value storage element. If desired, where the locked latency value storage element is a second shift register containing a single "one" that is clocked in response to each clock cycle in the first timing domain, step 522 may be replaced with a step of terminating (i.e., disabling) further shifting of the second shift register.

If the method of FIG. 5 is regarded as a sequential process, then control proceeds to step 524. If the method of FIG. 5 is regarded as an event-driven process, then the method terminates upon the completion of step 522 and then begins again at step 524 in response to a subsequent clock cycle.

At step 524, a subsequent clock cycle is detected. At step 526, a determination is made as to whether a READ command is needed. If a READ command is not needed, then at step 528, a "zero" is provided as an input to the shift register. If a READ command is needed, then at step 530, a READ command is generated (in a first timing domain), and at step 532, a "one" is provided as an input to the shift register. At step 534, the shift register is clocked. The method of FIG. 5 operates independently of other methods that determine whether to issue a READ command on any particular clock cycle.

At step 536, a determination is made as to whether the locked bit is set. The locked bit is initialized to a cleared (i.e., unset) value in response to a power-on event, and in response to a memory system reconfiguration. Consequently, the locked bit is not set when the only READ commands that are pending are the synthesized READ command and any other READ commands that may have been pipelined before data has been returned.

Unless and until the locked bit is set, control proceeds from step 536 to step 512. If no new data has arrived since the synthesized READ was generated, then sample data remains unequal to the synthesized data, and control proceeds from step 512 to step 524 to await a subsequent clock cycle. The "one" that was provided to the shift register at step 508 is clocked through the shift register, and has a bit-position that indicates a number of clock cycles of READ latency since the time when the synthesized READ command was synthesized. Eventually, data is returned from the off-chip memory device, and the data matches the synthesized data. At step 516, the determination is made that sampled data matches the synthesized data, and then control proceeds to step 520. At step 520, the locked bit is set, and at step 522, a single bit of the locked latency value storage element is set.

Once the locked bit has been set, control proceeds from step 536 to step 538. At step 538, a Boolean AND operation compares the shift register value with the locked latency value storage element, and at step 540, a determination is made as to whether the Boolean AND operation produces a non-zero result. Since the only bit of the locked latency value storage element that is set has a bit-position that represents the round-trip latency, and since the shift register is shifted upon each clock cycle and receives a "one" as input upon clock cycles where a READ command is generated, the Boolean AND operation produces a non-zero result during clock cycles when data may be expected to arrive. During such clock cycles, the Boolean AND operation produces a non-zero result, and control proceeds from step 540 to step 542. If the shift register does not contain a "one" in the bit position that corresponds to the single bit of the locked latency value storage element that was set, then the Boolean AND operation produces a zero result, and the method terminates (or returns to step 524 to await a subsequent clock cycle).

At step 542, a locked data signal is asserted. At step 544, a data sample signal is asserted. At step 546, data is sampled on the corresponding data circuit. At step 548, the read pointer value is incremented. It will be appreciated that the steps 542–548 may be performed in any order.

Conclusion

Since the on-chip controller has hardware that calculates and locks the interface latency value upon an initial event, software intervention is not required to force repeatably identical latency values in a system. Furthermore, with a software or hardware override capability of the locked latency value, the same latency value can be used across multiple systems to enforce identical latency for debugging purposes.

It will be understood that the foregoing description is merely an example of the invention, which is not limited by such description, but rather by the claims and their equivalents. The foregoing description is made only by way of example and not as a limitation to the scope of the invention. The teachings of the foregoing disclosure will suggest other modifications to those persons skilled in the relevant art, including some modifications that may involve other features which are already known and which may be used instead of or in addition to features already described herein.

The scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

Variations in the types of conductivities of transistors, the types of transistors, etc. may be readily made. Although specific logic circuits have been shown, numerous logic circuit implementations may be used to implement the functions discussed herein. To the extent that such modifications and variations do not depart from the spirit of the invention, they are intended to be included within the scope thereof that is assessed only by a fair interpretation of the following claims.

We claim:

1. An on-chip controller for issuing a READ command and for receiving data in response thereto, the on-chip controller operating in a first timing domain and comprising:

a data valid circuit, having a locked state and an unlocked state, operative to receive a data valid signal indicating that the data is valid, the data valid circuit operative to be initialized into the unlocked state and to transition to the locked state in response to the data valid signal;

a latency counter circuit implemented as a shift register operative to count clock cycles by shifting a predetermined shift register bit corresponding to a READ command in response to a clock cycle and to be reset in response to the issuing of the READ command, the shift register receiving a first logic bit if a READ command is generated during the clock cycle and receiving a second logic bit if a READ command is not generated during the clock cycle;

a locked latency value storage element that is operative to identify a selected bit of the shift register in accordance with a number of clock cycles associated with an expected READ latency; and a data sample circuit being operatively coupled to the data valid circuit and to the latency counter circuit, the data sample circuit being operative when the data valid circuit is in the locked state to sample the data in response to a determination that the latency counter circuit contains a value that compares favorably with a stored counter value, and being operative when the data valid circuit is in the unlocked state to sample data in response to the data valid signal.

2. The on-chip controller of claim 1, wherein the latency counter circuit further comprises:
a latency override storage element that is accessible, via at least one of software and hardware; and
a latency override select bit that is accessible, via at least one of software and hardware, that is operative to select one of (i) the latency override storage element and (ii) the locked latency value storage element.

3. The on-chip controller of claim 1, further comprising:
a locked latency value storage element that contains a locked latency value that is updated in response to the asserting of the data valid signal while the data valid circuit is in an unlocked state.

4. The on-chip controller of claim 1, wherein the data valid signal indicating that the data is valid is a data query strobe (DQS) signal as described in a Joint Electron Device Engineering Counsel (JEDEC) specification corresponding to a double-data rate (DDR) synchronous dynamic random access memory (SDRAM).

5. The on-chip controller of claim 1, wherein the data valid circuit includes a dual register synchronizer operative to synchronize the write pointer value with the first timing domain.

6. The on-chip controller of claim 1, wherein the data valid circuit is operative to receive a write pointer value that is incremented in response to the data valid signal, and to generate a miscompare signal in response to the write pointer value, synchronized by the dual register synchronizer, that is unequal to a read pointer value.

7. An on-chip controller for issuing a READ command and for receiving data in response thereto, the on-chip controller operating in a first timing domain and comprising:
a data valid circuit, having a locked state and an unlocked state, operative to receive a data valid signal indicating that the data is valid, the data valid circuit operative to be initialized into the unlocked state and to transition to the locked state in response to the data valid signal;
a latency counter circuit operative to count clock cycles and to he reset in response to the issuing of the READ command;
a data sample circuit being operatively coupled to the data valid circuit and to the latency counter circuit, the data sample circuit being operative when the data valid circuit is in the locked state to sample the data in response to a determination that the latency counter circuit contains a value that compares favorably with a stored counter value, and being operative when the data valid circuit is in the unlocked state to sample data in response to the data valid signal;
a locked bit operative to be set in response to the data valid signal at the on-chip controller, the locked bit providing a determination of whether the data valid circuit is in the locked state or in the unlocked state;
a read pointer of the data valid circuit, the read pointer having a read pointer value that is incremented in response to the asserting of a data sample signal from the data sample circuit;
a first comparator within the data valid circuit, the first comparator operative to generate a miscompare signal in response to the read pointer value being unequal to a synchronized write pointer value that is incremental in response to the data valid signal; and
a first logic circuit operative to assert an unlocked data valid signal in response to the miscompare signal when the locked bit is cleared.

8. An on-chip controller for issuing a READ command and for receiving data in response thereto, the on-chip controller operating in a first timing domain and comprising:
a data valid circuit, having a locked state and an unlocked state, operative to receive a data valid signal indicating that the data is valid, the data valid circuit operative to be initialized into the unlocked state and to transition to the locked state in response to the data valid signal;
a latency counter circuit operative to count clock cycles and to be reset in response to the issuing of the READ command;
a data sample circuit being operatively coupled to the data valid circuit and to the latency counter circuit, the data sample circuit being operative when the data valid circuit is in the locked state to sample the data in response to a determination that the latency counter circuit contains a value that compares favorably with a stored counter value, and being operative when the data valid circuit is in the unlocked state to sample data in response to the data valid signal;
a locked bit operative to be set in response to the data valid signal at the on-chip controller, the locked bit providing a determination of whether the data valid circuit is in the locked state or in the unlocked state;
a logic circuit of the latency counter circuit, the logic circuit of the latency counter circuit being operative to assert a locked data valid signal in response to the locked latency value comparing favorably with a shift register value when the locked bit is set; and
a logic circuit of the data sample circuit, the logic circuit of the data sample circuit being operative to assert the data sample signal in response to at least one of the unlocked data valid signal and the locked data valid signal.

9. An on-chip controller for issuing a READ command and for receiving data in response thereto, for an on-chip controller operating in a first timing domain and comprising:
a data valid circuit, having a locked state and an unlocked state, operative to receive a data valid signal indicating that the data is valid, the data valid circuit operative to be initialized into the unlocked state and to transition to the locked state in response to the data valid signal;
a latency counter circuit operative to count clock cycles and to be reset in response to the issuing of the READ command;
a data sample circuit being operatively coupled to the data valid circuit and to the latency counter circuit, the data sample circuit being operative when the data valid circuit is in the locked state to sample the data in response to a determination that the latency counter circuit contains a value that compares favorably with a stored counter value, and being operative when the data valid circuit is in the unlocked state to sample data in response to the data valid signal;
a clock generator circuit operative by the on-chip controller to provide a free-running clock signal to an off-chip device, where the off-chip device echoes the provided clock signal bank to the on-chip controller, and where the echoed clock is assumed to have a one-to-one relationship with the clock signal provided;

a first logic circuit that receives the echoed clock signal and makes a calculation whether the number of clock edges sent equal the number of clock edges received; and a second logic circuit that emits a data valid signal upon indication by the first logic circuit that the number of clock edges sent and received are equal.

10. A method for issuing a READ command and receiving READ data reproducibly on an interface with a variable recurring READ latency, the method comprising:

initializing a data valid circuit to an unlocked state;

transitioning the data valid circuit to a locked state in response to a data valid signal indicating the data is valid;

resetting a latency counter circuit in response to issuing the READ command;

counting clock cycles with the latency counter circuit;

operating a data sample circuit when the data valid circuit is in the locked state to sample the data in response to a determination that the latency counter circuit contains a value that compares favorably with a stored counter value, and operating the data sample circuit when the data valid circuit is in the unlocked state to sample data in response to the data valid signal;

providing a free-running clock signal to predetermined circuitry, where the predetermined circuitry echoes the free-running clock signal back to the data valid circuit, and where the echoed clock is assumed to have a one-to-one relationship with the free-running clock signal provided;

determining whether a number of clock edges sent equal a number of clock edges received; and providing the data valid signal upon indication that the number of dock edges sent and received are equal.

11. The method of claim 10, wherein the data valid signal is a data query strobe (DQS) signal as described in a Joint Electron Device Engineering Counsel (JEDEC) specification corresponding to a Double-Data Rate (DDR) Synchronous Dynamic Random Access Memory (SDRAM).

12. The method of claim 10, wherein the step of issuing a READ command is in response to a power-on event or an interface frequency change event.

* * * * *